(12) United States Patent
Barbat et al.

(10) Patent No.: US 10,112,570 B2
(45) Date of Patent: Oct. 30, 2018

(54) SEAT SUPPORTED AIRBAG (71) Applicant: Ford Global Technologies, LLC, Dearborn, MI (US)

(72) Inventors: Saeed David Barbat, Novi, MI (US); Mohammed Omar Faruque, Ann Arbor, MI (US); S. M. Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 39 days.

(21) Appl. No.: 15/404,269

(22) Filed: Jan. 12, 2017

(65) Prior Publication Data
US 2018/0194317 A1    Jul. 12, 2018

(51) Int. Cl.
*B60R 21/207* (2006.01)
*B60R 21/2338* (2011.01)
(Continued)

(52) U.S. Cl.
CPC ............ *B60R 21/207* (2013.01); *B60N 2/143* (2013.01); *B60N 2/68* (2013.01); *B60N 2/90* (2018.02); *B60R 21/2165* (2013.01); *B60R 21/237* (2013.01); *B60R 21/2338* (2013.01); *B60R 21/2342* (2013.01); *B60R 21/23138* (2013.01); *B60R 21/262* (2013.01); *B60R 21/264* (2013.01); *B60R 21/268* (2013.01); *B60R 2021/0048* (2013.01); *B60R 2021/0058* (2013.01); *B60R 2021/23386* (2013.01); *B60R 2021/23514* (2013.01); *B60R 2021/23542* (2013.01)

(58) Field of Classification Search
CPC ................................................... B60R 21/207
See application file for complete search history.

(56) References Cited

U.S. PATENT DOCUMENTS 7,150,468 B2    12/2006 Pan
7,207,596 B2 *  4/2007 Linder .................. B60R 21/207
                                                         280/729
(Continued)

FOREIGN PATENT DOCUMENTS

DE        19859988 A1    6/2000
DE    102009040641 A1    4/2010
(Continued)

OTHER PUBLICATIONS

Hovding—Airbag for cyclists: How it works; http://www.hovding.com/how_hovding_works (downloaded Nov. 10, 2017); 9 pages.
(Continued)

*Primary Examiner* — Nicole T Verley
(74) *Attorney, Agent, or Firm* — Frank A. MacKenzie; Bejin Bieneman PLC (57) ABSTRACT

A seating assembly for use in a vehicle includes a seat back and an airbag. The seat back has a bottom, a top, and a midpoint between the bottom and the top. The airbag is supported by the seat back and is inflatable to an inflated position. In the inflated position the airbag may extend from the top to a location between the midpoint and the bottom and define a cavity with an opening facing the bottom and away from the seat back.

17 Claims, 6 Drawing Sheets (51) Int. Cl.

| | | |
|---|---|---|
| *B60R 21/2165* | (2011.01) | |
| *B60R 21/2342* | (2011.01) | |
| *B60R 21/231* | (2011.01) | |
| *B60R 21/237* | (2006.01) | |
| *B60R 21/262* | (2011.01) | |
| *B60N 2/68* | (2006.01) | |
| *B60N 2/14* | (2006.01) | |
| *B60N 2/90* | (2018.01) | |
| B60R 21/264 | (2006.01) | |
| B60R 21/268 | (2011.01) | |
| B60R 21/235 | (2006.01) | |
| B60R 21/00 | (2006.01) | |

(56) References Cited

U.S. PATENT DOCUMENTS

| | | | |
|---|---|---|---|
| 7,665,761 B1 * | 2/2010 | Green | B60R 21/18 |
| | | | 280/730.1 |
| 8,402,568 B2 | 3/2013 | Alstin et al. | |
| 9,132,798 B2 * | 9/2015 | Yasuoka | B60R 21/2334 |
| 9,156,426 B1 | 10/2015 | Faruque et al. | |
| 9,428,138 B2 | 8/2016 | Farooq et al. | |
| 9,533,651 B1 * | 1/2017 | Ohno | B60R 21/23138 |
| 9,573,553 B2 * | 2/2017 | Ko | B60R 21/233 |
| 9,604,588 B1 * | 3/2017 | Rao | B60R 21/01534 |
| 9,783,155 B2 * | 10/2017 | Kondo | B60N 2/79 |
| 9,919,673 B2 * | 3/2018 | Ohno | B60R 21/207 |
| 9,925,943 B2 * | 3/2018 | Ohno | B60R 21/207 |
| 2004/0169356 A1 * | 9/2004 | Linder | B60R 21/23138 |
| | | | 280/730.2 |
| 2013/0015642 A1 * | 1/2013 | Islam | B60R 21/207 |
| | | | 280/730.1 |
| 2014/0015233 A1 | 1/2014 | Fukawatase | |
| 2014/0327234 A1 * | 11/2014 | Heurlin | B60R 21/207 |
| | | | 280/730.1 |
| 2016/0121839 A1 * | 5/2016 | Ko | B60R 21/233 |
| | | | 280/730.1 |
| 2016/0347272 A1 * | 12/2016 | Kato | B60R 21/207 |
| 2017/0028955 A1 * | 2/2017 | Ohno | B60R 21/207 |
| 2017/0057456 A1 * | 3/2017 | Ohno | B60R 21/23138 |
| 2017/0136977 A1 * | 5/2017 | Ohno | B60R 21/013 |
| 2017/0144622 A1 * | 5/2017 | Perlo | B60R 21/207 |
| 2017/0158155 A1 * | 6/2017 | Ohno | B60R 21/207 |
| 2017/0203711 A1 * | 7/2017 | Ohno | B60R 21/203 |
| 2017/0282834 A1 * | 10/2017 | Sugie | B60R 21/01512 |
| 2017/0282933 A1 * | 10/2017 | Ohmi | B60R 21/23138 |
| 2017/0291564 A1 * | 10/2017 | Ohmi | B60R 21/237 |
| 2017/0291565 A1 * | 10/2017 | Yamamoto | B60R 21/207 |
| 2017/0297524 A1 * | 10/2017 | Sugie | B60R 21/01554 |
| 2017/0334385 A1 * | 11/2017 | Sakakibara | B60R 21/207 |

FOREIGN PATENT DOCUMENTS

| | | |
|---|---|---|
| DE | 102099037279 A1 | 2/2011 |
| KR | 1020080080968 A | 9/2008 |
| WO | 2007099667 A1 | 9/2007 |
| WO | 2015145285 A1 | 10/2015 |
| WO | 2017145116 A1 | 8/2017 |

OTHER PUBLICATIONS

GB Search Report dated Jun. 21, 2018 re GB Appl. No. 1800210.5.

* cited by examiner

SEAT SUPPORTED AIRBAG

BACKGROUND

A vehicle may include a variety of airbags that can deploy during a vehicle impact to absorb energy and control movement of an occupant of the vehicle. The airbag may be a component of an airbag assembly including a housing supporting the airbag, and an inflator in fluid communication with the airbag for inflating the airbag from an uninflated position to an inflated position. Airbag assemblies may be supported by a steering wheel of the vehicle, an instrument panel of the vehicle, a headliner of the vehicle, etc.

The vehicle may include an impact sensing system in communication with the airbag assembly for sensing the vehicle impact and instructing the inflator to inflate the airbag when the vehicle impact is sensed. The impact sensing system may sense a direction of the impact and may selectively inflate, or not inflate, certain airbags of the vehicle or extensions of the airbag based on the type and magnitude of impact that is sensed, e.g., based on direction, magnitude, etc.

Airbags may be designed to protect an occupant based on a fixed orientation of an occupant of the vehicle. For example, an airbag housed within a vehicle steering wheel may protect an occupant of a driver's seat in a front impact collision, where the occupant, and the driver's seat, are oriented to face the steering wheel. Similarly, a side curtain airbag supported above a vehicle side door may protect the occupant of the driver's seat in a side impact collision, where the occupant, and the driver's seat, are oriented to face the steering wheel.

Effectiveness of airbags is determined with the use of crash test dummies. Crash test dummies are designed to replicate various sizes of people. For example, a Hybrid III $50^{th}$ male crash dummy is designed to replicate the size of an average adult male. The dimensions of the Hybrid III $50^{th}$ male have been adopted by the National Highway Traffic Safety Administration (NHSTA) as standards to be used when evaluating motor vehicle safety.

DETAILED DESCRIPTION

With reference to the Figures, wherein like numerals indicate like parts throughout the several views, a vehicle 15 with an example seat assembly 20 for protecting an occupant of the vehicle 15 is shown. The seat assembly 20 includes a seat back 25 and an airbag 40. The seat back 25 has a bottom 26a, a top 26b, and a midpoint M between the bottom 26a and the top 26b. The airbag 40 is supported by the seat back 25 and inflatable to an inflated position. In the inflated position the airbag 40 extends from the top 26b to a location L between the midpoint M and the bottom 26a and defines a cavity 41 with an opening 42 facing the bottom 26a and away from the seat back 25.

The airbag 40 defining the cavity 41 with the opening 42 facing the bottom 26a and away from the seat back 25 provides omnidirectional impact protection for the occupant of the seat assembly 20. For example, the airbag protects the sides of a head and shoulders of the occupant, as well as a top of the head of the occupant, such as during a rollover of the vehicle 15 where forces may impact the vehicle 15 from multiple directions.

In the following description, relative orientations and directions (by way of example, in front, behind, side, top, bottom, lateral, longitudinal etc.) are from the perspective of the occupant seated in the seat assembly 20 supporting the airbag 40. The adjectives "first" and "second" are used throughout this document as identifiers and are not intended to signify importance or order.

The vehicle 15 may be an autonomous vehicle. Autonomous vehicles use a variety of sensors and computing devices to navigate the vehicle 15 to a destination with various levels of input from a human driver. The Society of Automotive Engineers (SAE) has defined multiple levels of autonomous vehicle operation. At levels 0-2, the human driver monitors or controls the majority of the driving tasks, often with no help from the vehicle 15. For example, at level 0 ("no automation"), a human driver is responsible for all vehicle 15 operations. At level 1 ("driver assistance"), the vehicle 15 sometimes assists with steering, acceleration, or braking, but the driver is still responsible for the vast majority of the vehicle 15 control. At level 2 ("partial automation"), the vehicle 15 can control steering, acceleration, and braking under certain circumstances without human interaction. At levels 3-5, the vehicle 15 assumes more driving-related tasks. At level 3 ("conditional automation"), the vehicle 15 can handle steering, acceleration, and braking under certain circumstances, as well as monitoring of the driving environment. Level 3 requires the driver to intervene occasionally, however. At level 4 ("high automation"), the vehicle 15 can handle the same tasks as at level 3 but without relying on the driver to intervene in certain driving modes. At level 5 ("full automation"), the vehicle 15 can handle almost all tasks without any driver intervention.

Figure 1:
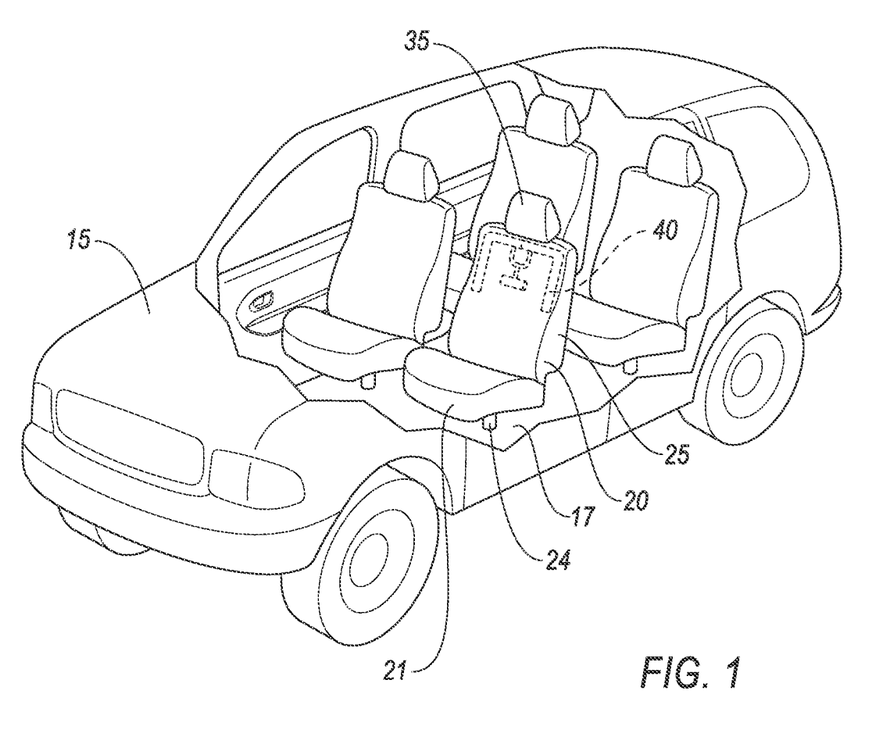
FIG. 1 is a perspective view of an example vehicle with a cutaway to show an example seat assembly supporting an example airbag in an example housing.
Figure 2:
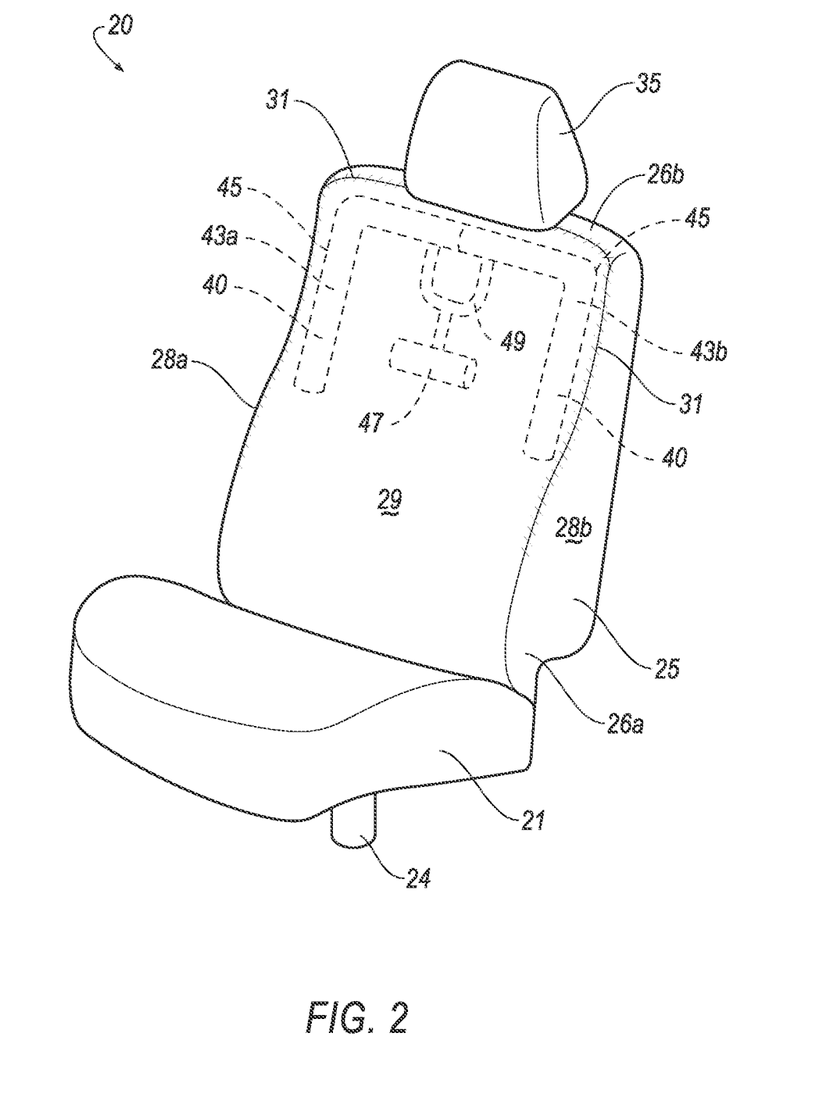
FIG. 2 is a perspective view of the example seat assembly.
Figure 3:
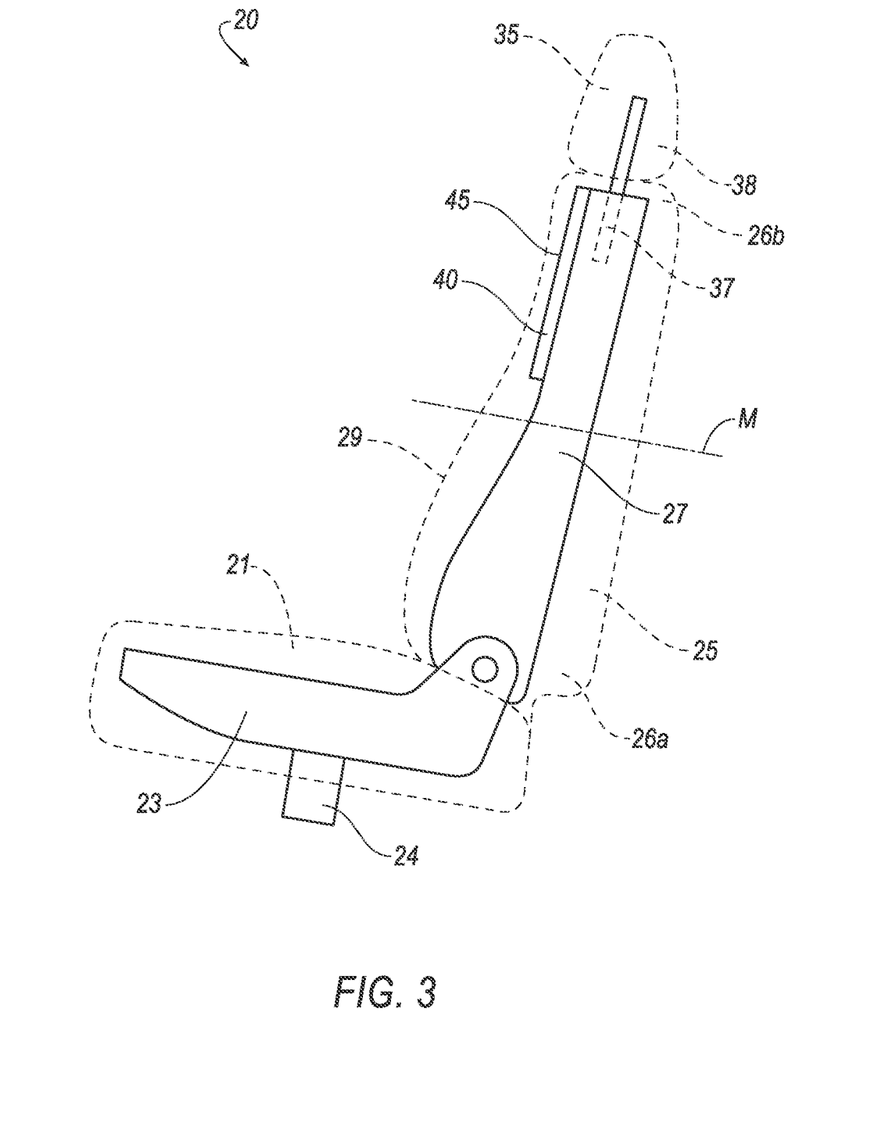
FIG. 3 is a side view of the example seat assembly.

With reference to FIGS. 1-3, the vehicle 15 having the seat assembly 20 supporting the airbag 40 in an uninflated position is shown. The seat assembly 20 may include a seat bottom 21 and a head restraint 35. The seat back 25 may be supported by the seat bottom 21. The head restraint 35 may be supported by the seat back 25.

The seat bottom 21 provides seating support for the occupant of the vehicle 15. The seat bottom 21 may include a frame 23. Spring and cushion structures may be supported by the frame 23. The seat bottom 21 may have a surface covering, such as fabric, leather, or other suitable material.

The seat bottom 21 may be supported by the vehicle 15, such as being supported by the floor 17. The seat bottom 21 may be rotatable relative to the floor 17, e.g., when the vehicle 15 is an autonomous vehicle. The vehicle 15 may include a rotating support member 24 between the seat bottom 21 and the floor 17. For example, the rotating support member 24 may be secured to the floor 17 of the vehicle 15 at one end of the rotating support member 24, and to the frame 23 at an opposing end of the rotating support member 24.

The rotating support member 24 allows rotational movement of the seat bottom 21 relative to floor 17 when the rotating support member 24 is secured to the seat bottom 21 and floor 17. As one example, the ends of the rotating support member 24 may be rotatable relative to each other. As another example, the ends of the rotating support member 24 may be fixed relative to each other. In such an example, the rotating support member 24 may be rotatable relative to the seat bottom 21 and or the floor 17.

The airbag 40 defines the cavity 41 with the opening 42 facing the bottom 26a and away from the seat back 25, which provides omnidirectional impact protection for the occupant of the seat assembly 20 regardless of the orientation of the seat assembly 20 relative to the floor 17. Since the opening 42 faces the bottom 26a, the opening receives the torso of the occupant and the airbag 40 extends around the torso of the occupant. Since the opening 42 faces away from the seat back 25, the airbag 40 extends around the head of the occupant and does not cover the face of the occupant, i.e., is open to the face of the occupant.

The seat back 25 provides reclining support for the occupant of the vehicle 15. The seat back 25 may include a frame 27. Spring and cushion structures may be supported by the frame 27. The seat back 25 may have a surface covering, such as fabric, leather, or other suitable material.

The seat back 25 may include opposing ends including the bottom 26a and the top 26b. The seat back 25 many include opposing sides, such as a first side 28a and a second side 28b. The seat back 25 may include a front 29. The bottom 26a and top 26b extends from outermost distal ends of the seat back 25 inwardly towards the midpoint M. The midpoint M of the seat back 25 is located equidistant between the bottom 26a and the top 26b, i.e. half way such that the distance from the midpoint M to the bottom 26a is the same as the distance from the midpoint M to top 25b.

As shown in FIG. 2, the seat back 25 may be supported by the seat bottom 21, such as with a reclining mechanism or other mechanical attachment. The seat back 25 may be oriented such that the bottom 26a is closer to the seat bottom 21 than the top 26b.

The seat back 25 may include a tear seam 31. The tear seam 31 tears when the airbag 40 deploys. The tear seam 31 may be located where the sides 28a, 28b and top 26b abut the front 29 of the seat back 25. The tear seam 31 may be provided by a portion of the seat back 25 being made with a lower strength than a surrounding area. For example, the tear seam 31 may be may of relatively weaker or thinner material, such a seam between two panels of material.

The head restraint 35 is supported by the seat back 25 at the top 26b of the seat back 25. As shown in FIG. 3, the head restraint 35 may include support posts 37 that extend away from a main portion 38 of the head restraint 35. The support posts 37 may, at least partially, be disposed within the seat back 25, such as being supported by the frame 27 of the seat back 25. Within the seat back 25, the support posts 37 are disposed behind the airbag 40, with the airbag 40 disposed in front of the support posts 37. The head restraint 35 provides support for the head of the occupant of the vehicle 15.

The airbag 40 may be formed of any suitable airbag material, for example, a woven polymer. For example, the airbag 40 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The airbag 40 may include multiple chambers 43a, 43b, such as first chamber 43a and second chamber 43b. The first chamber 43a and second chamber 43b may be fluidly separated from each other. For example, the first chamber 43a may be designed such that fluid flowing into the first chamber 43a, such as from a fill tube 49, does not flow through the first chamber 43a to the second chamber 43b, and vice versa. The chambers 43a 43b may each be housed within, and supported by, their own individual housing 45.

The airbag 40 may include the housing 45, an inflator 47, and the fill tube 49. The housing 45 of the airbag 40 may be supported by the frame 27 of the seat back 25. The airbag 40 may be on an interior of the seat back 25. Within the seat back 25, the airbag 40 and housing 45 may be located in a position that is in front of the head restraint 35 support posts 37, i.e., the housing 45 may be located between the support posts 37 and the front 29, e.g., the surface covering of the front 29.

Figure 4:
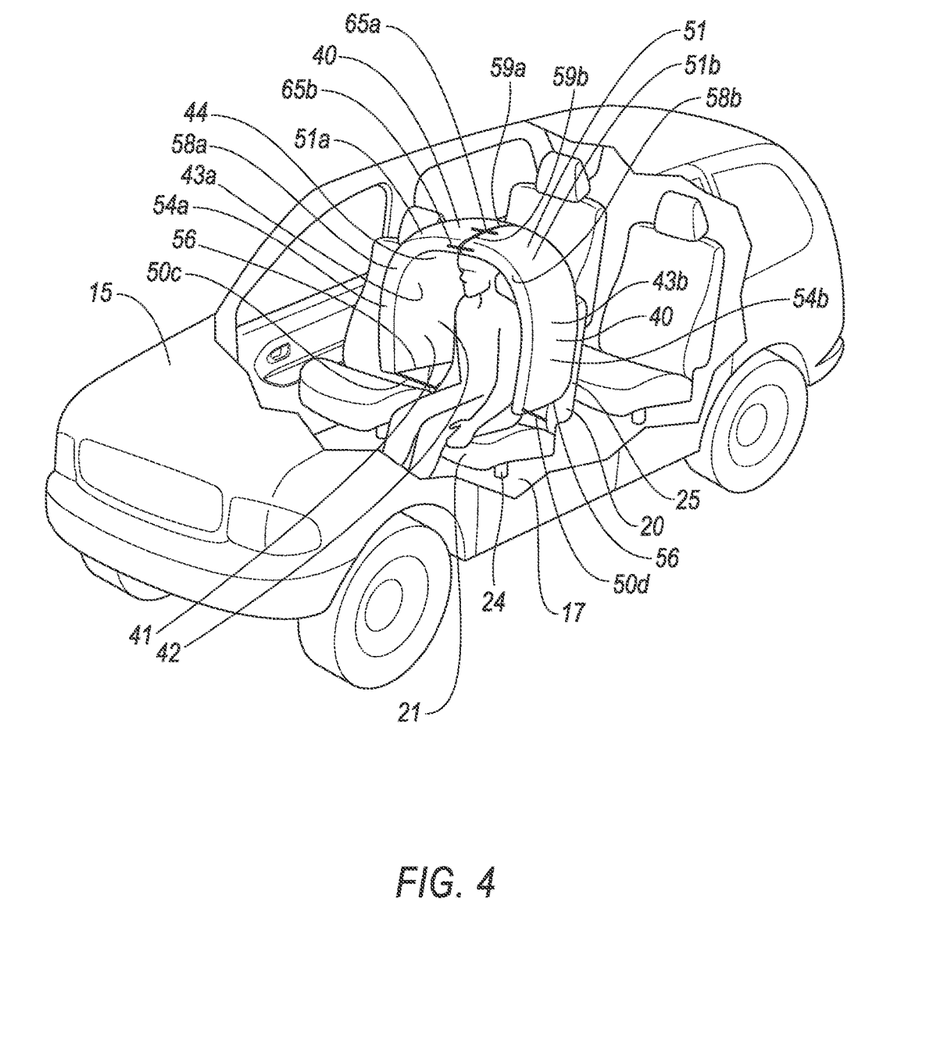
FIG. 4 is a perspective view of the example vehicle with the cutaway showing the example seat assembly in the example vehicle with the example airbag inflated.
Figure 5:
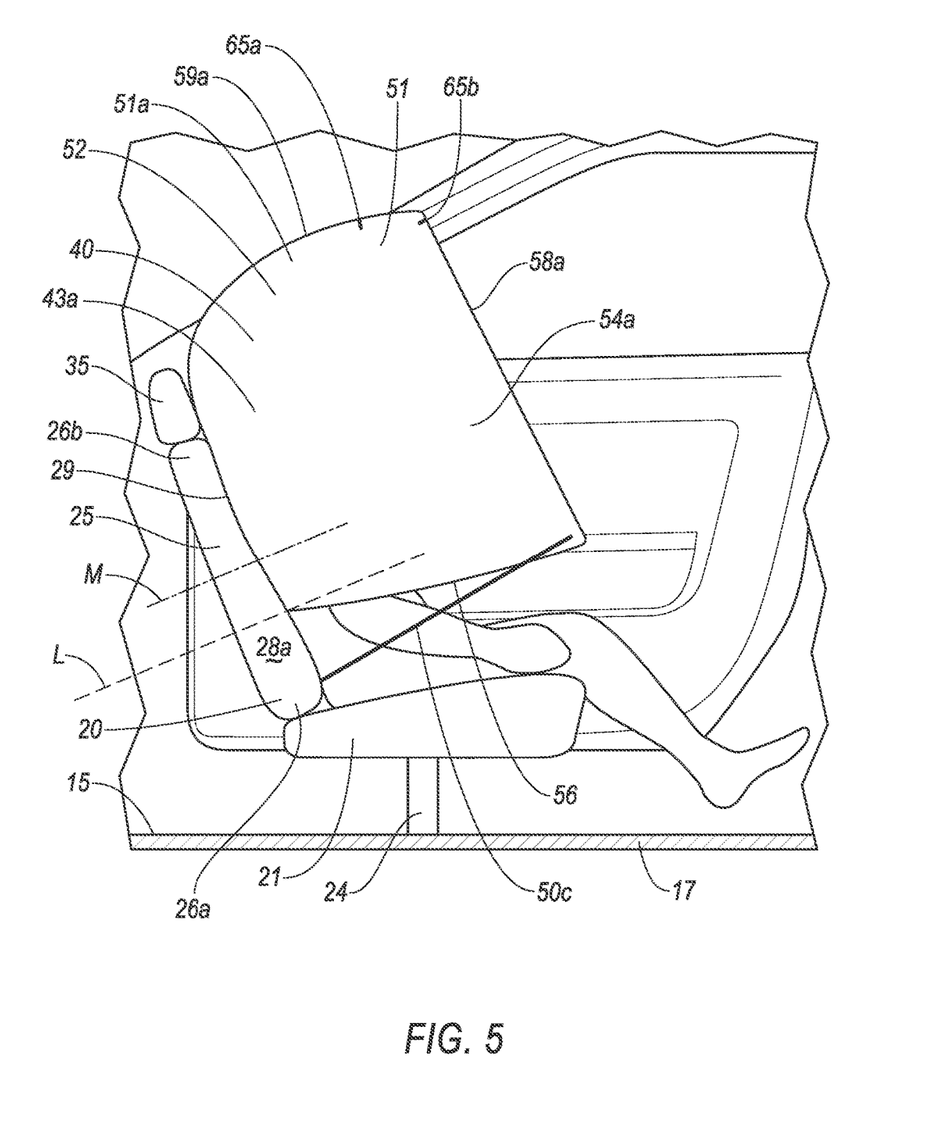
FIG. 5 is a side view of an interior of the example vehicle having the example seat assembly facing a first direction with the example airbag inflated.
Figure 6:
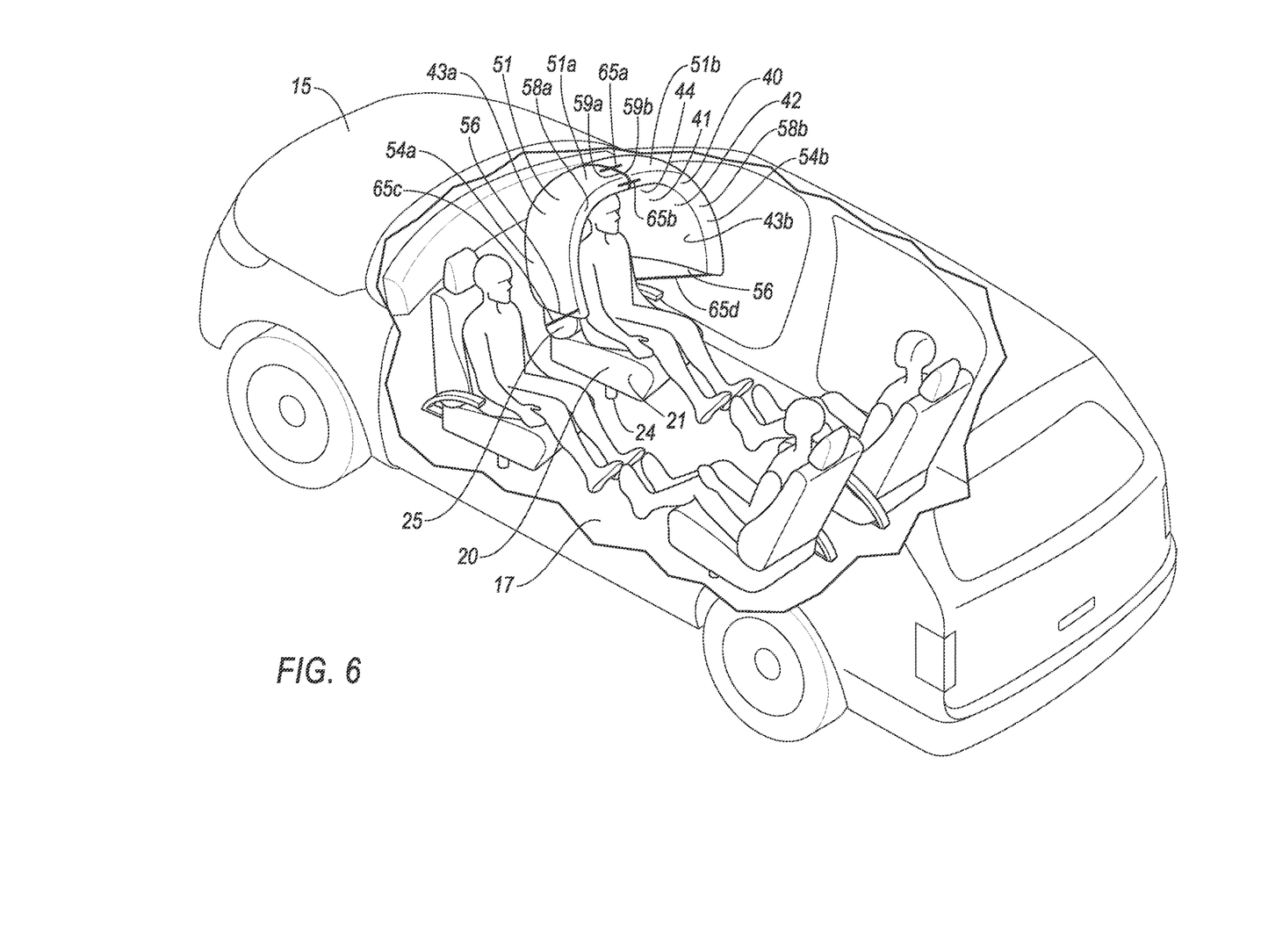
FIG. 6 is a perspective view of the example vehicle having the example seat assembly facing a second direction with the example airbag inflated.

The housing 45 may be of any suitable type and construction, e.g., a rigid polymer, a metal, a composite, or a combination of rigid materials. The housing 45 may be configured to house the airbag 40 in an uninflated position, as shown in FIGS. 1-3, and support the airbag in an inflated position, as shown in FIGS. 4-6. The airbag 40 may be rolled and/or folded to fit within the housing 45.

The inflator 47 may be connected to the airbag 40. Upon receiving a signal, e.g., from a vehicle controller, the inflator 47 may inflate the airbag 40 with an inflatable medium, such as a gas. The inflator 47 may be, for example, a pyrotechnic inflator that uses a chemical reaction to drive inflation medium to the airbag 40. The inflator 47 may be of any suitable type, for example, a cold-gas inflator.

As shown if FIG. 2, the inflator 47 is in fluid communication with the airbag 40, such as through the fill tube 49. The fill tube 49 directs gas provided by the inflator 47 to the airbag 40. The fill tube 49 may direct gas to each chamber 43a 43b of the airbag 40. For example, the fill tube 49 may be Y-shaped, the inflator 47 providing gas flow to a bottom of the Y-shape, the gas flowing from one side of the top of the Y-shape to the first chamber 43a and from an opposite side of the top of the Y-shape to the second chamber 43b. Although not shown in the drawings, each chamber 43a, 43b may be inflated via its own inflator and fill tube. Gas provided from the inflator 47 inflates the airbag 40, causing the airbag 40 to unfold and/or unroll, rupturing the seat back 25 along the tear seam 31 as the airbag 40 inflates.

The airbag 40 is inflatable from an uninflated position, as shown in FIGS. 1-3, to an inflated position, as shown in FIGS. 4-6.

The airbag 40 may have a top panel 51 at the top 26b of the seat back 25. In the inflated position, the top panel 51 may extend forwardly away from the seat back 25 along a width of the top 26b, and may be located above the top 26b. The top panel 51 may be formed from portions of the first chamber 43a and the second chamber 43b, such as the first and the second chamber 43a, 43b each including a top portion 51a, 51b at the top 26b of the seat back 25. The top portions 51a, 51b of the first and second chamber 43a, 43b may abut each other.

The airbag 40 may have a first leg 54a and a second leg 54b spaced from the first leg 54a. The first leg 54a and second leg 54b may extend from the top panel 51, or top portions 51a, 51b, toward the bottom 26a of the seat back 25 on opposite sides of the cavity 41. The first leg 54a and second leg 54b may extend along a vertical plane at the sides 28a, 28b. In the inflated position the first leg 54a and the second leg 54b each have a bottom edge 56 distal to the top panel 51.

Each bottom edge 56 of the airbag 40 may extend forwardly away from opposing sides, i.e., one from the first side 28a and one from the second side 28b, of the seat back 25. The bottom edges 56 extending from each respective side 28a 28b may have an arcuate shape that curves both laterally outward and longitudinally forward from the respective side 28a 28b of the seat back 25. The bottom edge 56 of the first leg 54a and the second leg 54b may be disposed between the bottom 26a of the seat back 25 and the midpoint M of the seat back 25.

In the inflated position the airbag 40 may be designed to extend from the top 26b to below a shoulder of the occupant of the seat assembly 20. For example, a crash test dummy may be used to replicate the seat occupant, such as by positioning the dummy in a seated position on the seat bottom 21, with shoulders of the dummy compared to the bottom edges 56 of the airbag 40. For example, in the inflated position the airbag 40 may be designed to extend from the top 26b to below a shoulder of a Hybrid III $50^{th}$ male crash test dummy positioned in a seated position on the seat bottom 21 and may define the cavity 41 with the opening 42 facing the bottom 26a and away from the seat back 25.

In the inflated position the airbag 40 may have a front edge 58a, 58b spaced from the seat back 25 and extending along the cavity 41. An inner surface 44 of the airbag 40 may extend along the cavity 41 from the front edge 58a, 58b to the seat back 25. The inner surface 44 may extend continuously between the front edge 58a, 58b and the seat back 25, e.g., the inner surface 44 may be void of any gaps, apertures, mesh panels, etc. The airbag 40 may deploy in front of the head restraint 35 such that in the inflated position the head restraint 35 is outside of the cavity 41.

The front edge 58a, 58b extends from one bottom edge 56 to the other bottom edge 56, such as in a vertical arc. For example, the front edge 58a may start at a distal end of the bottom edge 56 that extends from the first side 28a of the seat back 25, the front edge 58a may extend vertically toward the top 26b, then extend arcuately towards a center point of the seat assembly 20 between the first side 28a and the second side 28b. From the center point, the front edge 58b may extend arcuately outward and downward towards the top 26b, then extend vertically downward towards a distal end of the bottom edge 56 that extends from the second side 28b of the seat back 25.

In the inflated position, for example, the airbag 40 may have a quarter-ellipsoid shape. The quarter-ellipsoid shape of the airbag 40 may be defined by the pair of bottom edges 56 and the front edge 58a 58b. In the alternative, the airbag 40 in the inflated position may have any suitable shape.

The quarter-ellipsoid shape of the airbag 40 may be bisected into two ⅛ ellipsoid shaped chambers, such as the first chamber 43a and the second chamber 43b. Each chamber 43a 43b may include a top edge 59a, 59b that extends from the top 26b of the seat back 25 to the front edge 58a, 58b. The top edge 59a, front edge 58a, and bottom edge 56 define a ⅛ ellipsoid shape to the first chamber 43a of the airbag 40. Similarly, the top edge 59b, front edge 58b, and bottom edge 56 define the ⅛ ellipsoid shape to the second chamber 43b of the airbag 40. The top edge 59b of the first chamber 43a abuts the top edge 59a of the second chamber 43b, and front edge 58a of the first chamber 43a aligns with the front edge 58b of the second chamber 43b, such that the first chamber 43a and second chamber 43b together provide the quarter ellipsoid shape of the airbag 40.

One or more tethers 65a-65d may position the airbag 40 in the inflated position relative to the seat back 25, and the chambers 43a 43b relative to each other. For example, the tethers 65a, 65b may connect the first chamber 43a to the second chamber 43b. As shown in FIGS. 4 and 6, one end of the tether 65a may be connected to the first chamber 43a proximate, i.e. within 10 inches, the top edge 59a and spaced apart, i.e. further than 3 inches, from the front edge 58a. The tether 65a may extend over the abutting top edges 59a, 59b, with an opposite end of the tether 65a connected to the second chamber 43b proximate the top edge 59b and spaced apart from the front edge 58b. The tether 65b may be connected to the first chamber 43a proximate the top edge 59a and at the front edge 58a. The tether 65b may extend over the abutting top edges 59a, 59b, with an opposite end of the tether 65b connected to the second chamber 43b proximate the top edge 59b and at the front edge 58b.

As another example, the tethers 65c, 65d may secure the airbag 40 to the seat assembly 20. As shown in FIGS. 4-6, a first tether 65c may connect the airbag 40 to the first side 28a of the seat back 25. For example, one end of the tether 65c may be connected to the first chamber 43a of the airbag 40 proximate the bottom edge 56 and proximate the front edge 58a. An opposite end of the tether 65c may be connected proximate first side 28a of seat back 25. A second tether 65d may connect the airbag 40 to the second side 28b of the seat back. For example, tether 65d may secure the second chamber 43b to the second side 28b of the seat back 25 similar to the tether 65c securing the first chamber 43a to the first side 28a of the seat back 25.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a seat back having a bottom, a top, and a midpoint between the bottom and the top;
   an airbag supported by the seat back and inflatable to an inflated position;
   a first tether connecting the airbag to a first side of the seat back and a second tether connecting the airbag to a second side of the seat back; and
   in the inflated position the airbag extends from the top to a location between the midpoint and the bottom and defines a cavity with an opening facing the bottom and away from the seat back.

2. The assembly of claim 1, wherein in the inflated position the airbag has a quarter-ellipsoid shape.

3. The assembly of claim 1, wherein the airbag has a first chamber and a second chamber fluidly separated from each other.

4. The assembly of claim 3, wherein the first and the second chamber each includes a top portion at the top of the seat back and a leg extending from the top portion toward the bottom of the seat back, wherein the top portion of the first and second chamber abut each other, and wherein the leg of first and second chamber are on opposite sides of the cavity.

5. The assembly of claim 3, further comprising a tether connecting the first chamber to the second chamber.

6. The assembly of claim 1, wherein the airbag in the inflated position has a front edge spaced from the seat back and extending along the cavity, and an inner surface extending along the cavity from the front edge to the seat back.

7. The assembly of claim 1, wherein the airbag has a first leg and a second leg spaced from the first leg, wherein in the inflated position the first leg and the second leg each have a bottom edge disposed between the bottom of the seat back and the midpoint of the seat back.

8. The assembly of claim 1, wherein the airbag has a top panel at the top of the seat back, and a first leg and a second leg extending from the top panel toward the bottom of the seat back on opposite sides of the cavity.

9. The assembly of claim 8, wherein the first leg and the second leg each include a bottom edge distal to the top panel, and in the inflated position the bottom edges are disposed between the bottom of the seat back and the midpoint of the seat back.

10. An assembly comprising:
a seat bottom;
a seat back having a top and a bottom, the seat back supported by the seat bottom at the bottom;
an airbag supported by the seat back and inflatable to an inflated position, the airbag having a first chamber and a second chamber fluidly separated from each other; and
in the inflated position the airbag is designed to extend from the top to below a shoulder of a Hybrid III 50$^{th}$ male crash test dummy positioned in a seated position on the seat bottom and defines a cavity with an opening facing the bottom and away from the seat back.

11. The assembly of claim 10, wherein the first and the second chamber each includes a top portion at the top of the seat back and a leg extending from the top portion toward the bottom of the seat back, wherein the top portion of the first and second chamber abut each other, and wherein the leg of first and second chamber are on opposite sides of the cavity.

12. The assembly of claim 11, further comprising a first tether connecting the airbag to a first side of the seat back and a second tether connecting the airbag to a second side of the seat back.

13. The assembly of claim 10, wherein the airbag in the inflated position has a front edge spaced from the seat back and extending along the cavity, and an inner surface extending along the cavity from the front edge to the seat back.

14. A vehicle comprising:
a floor;
a seat bottom rotatably supported by the floor;
a seat back having a top opposite a bottom and supported by the seat bottom at the bottom;
an airbag supported by the seat back and inflatable to an inflated position, the airbag having a first chamber and a second chamber fluidly separated from each other; and
in the inflated position the airbag extends from the top toward the bottom and defines a cavity with an opening facing the bottom and away from the seat back.

15. The vehicle of claim 14, wherein the first and the second chamber each includes a top portion at the top of the seat back and a leg extending from the top portion toward the bottom of the seat back, wherein the top portion of the first and second chamber abut each other, and wherein the leg of first and second chamber are on opposite sides of the cavity.

16. The vehicle of claim 14, further comprising the seat back having a midpoint between the bottom and the top, wherein in the inflated position the airbag extends from the top to a location between the midpoint and the bottom.

17. The vehicle of claim 14, further comprising a head restraint supported by the seat back and in the inflated position the head restraint is outside of the cavity.

* * * * *